United States Patent
Reith

(10) Patent No.: US 7,344,478 B2
(45) Date of Patent: Mar. 18, 2008

(54) METHOD FOR TRIGGERING AN UPSHIFT DURING KICK-DOWN CONDITIONS

(75) Inventor: Ulrich Reith, Schlier (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 105 days.

(21) Appl. No.: 11/319,962

(22) Filed: Dec. 28, 2005

(65) Prior Publication Data
US 2006/0154785 A1 Jul. 13, 2006

(30) Foreign Application Priority Data
Jan. 13, 2005 (DE) .......................... 10 2005 001 550

(51) Int. Cl.
*B60W 10/02* (2006.01)
*B60W 10/18* (2006.01)

(52) U.S. Cl. ...................................... 477/171; 477/172

(58) Field of Classification Search ................ 477/171, 477/172
See application file for complete search history.

(56) References Cited

U.S. PATENT DOCUMENTS

| | | | | |
|---|---|---|---|---|
| 5,911,646 | A * | 6/1999 | Tsutsui et al. | 477/93 |
| 6,155,956 | A * | 12/2000 | Hayashi | 477/170 |
| 6,315,372 | B1 * | 11/2001 | Kroger et al. | 303/191 |
| 6,332,521 | B1 * | 12/2001 | Shoji | 192/55.61 |
| 6,679,810 | B1 * | 1/2004 | Boll et al. | 477/195 |
| 7,153,235 | B2 * | 12/2006 | Takamura et al. | 477/172 |
| 7,166,060 | B2 * | 1/2007 | Jlang et al. | 477/172 |
| 2002/0065170 | A1 * | 5/2002 | Suzuki | 477/171 |
| 2004/0033861 | A1 * | 2/2004 | Wheeler et al. | 477/83 |

FOREIGN PATENT DOCUMENTS

| | | |
|---|---|---|
| DE | 44 21 088 A1 | 10/1994 |
| DE | 198 48 448 A1 | 5/2000 |
| DE | 101 05 749 A1 | 8/2002 |
| DE | 102 44 024 A1 | 4/2004 |
| DE | 600 02 938 T2 | 5/2004 |
| DE | 102 60 010 A1 | 7/2004 |
| DE | 103 06 363 A1 | 8/2004 |
| DE | 103 24 446 B3 | 12/2004 |

* cited by examiner

*Primary Examiner*—Sherry Estremsky
(74) *Attorney, Agent, or Firm*—Davis Bujold & Daniels, P.L.L.C.

(57) ABSTRACT

A procedure for controlling a start-up assistant control of a vehicle with a transmission, an automatically controllable clutch and at least an automatically controllable brake affecting the wheels of the vehicle, which can be activated by the driver to halt the vehicle and which with the start-up assistant control unit increases the jerking degree of the clutch on activation of a starting operating system and which at least releases the brakes. The jerk degree of the clutch, which signals the brakes to be released is selected dependent on the operating reactions of the drive train actuators, derived from the current accelerator pedal position and/or accelerator pedal adjustment speed. It can be guaranteed by considering the dead time between the issuance of a release instruction of the brakes and the actual release of the brakes along with, release of torque of the engine, the desired torque corresponds to the brake.

11 Claims, No Drawings

METHOD FOR TRIGGERING AN UPSHIFT DURING KICK-DOWN CONDITIONS

This application claims priority from German Application Serial No. 10 2005 001 550.6 filed Jan. 13, 2005.

FIELD OF THE INVENTION

This invention concerns a procedure for the control of the starting process of an automobile.

BACKGROUND OF THE INVENTION

To prevent the rolling of a standing automobile on a level surface it is usually necessary to engage the brakes. From a technical standpoint there are a large number of procedures, which could prevent the unintentional rolling of a standing automobile. Braking power is usually applied by way of a control unit on the controllable actuator of the brakes. If the vehicle is moved, then the automatic braking is released. If shutting off the engine is not enough, along with applying the clutch and transmission to the wheels to prevent the inadvertent rolling of the vehicle on an inclined surface, then this is a dangerous situation. If the brakes are released too late, this causes needless torque on the vehicle brakes and can lead to increased wear and tear, increased fuel consumption and unnecessary emission of pollutants.

From DE 102 44 024 A1, a procedure is known which prevents the unintentional rolling of a standing vehicle which, with an activated stop function against inadvertent rolling, can be used to apply the brakes through operation of the clutch regulating distance either manually or automatically when the clutch is released. The clutch regulating distance, which is used when the brakes are released, is calculated with the help of ascertained values of the vehicle weight and the grade of the roadway.

In vehicles with the automatic operation of the start-up clutch, the operating position of the clutch at start-up along with the rate of motion of the accelerator pedal are automatically determined. Because drivers depress the accelerator quickly or slowly and the accelerator pedal over time because of more or less resistance, it follows that the control systems would have to calculate the time differently at which the clutch regulating distance is set. The release of the brakes, along with the determination of the preset clutch, regulating distance occurs after a signal is issued to the brakes with a specific time delay. Then this procedure can transfer the drive motor at the time of the release of the brakes according to the moving speed and scan angle of the accelerator pedal to the wheels. It is possible that the vehicle can experience unintentional rolling or also an unintentionally fast acceleration when the brakes are released due to too light or heavy torque on the wheels.

With other control systems for automated transmissions and automatically controlled clutches, the drive motor is limited to a certain engine momentum or speed. Different accelerator pedal positions will be dependant then firstly on the engaging speed of the clutch and/or the speed of momentum and the vehicle's achieving the desired speed.

From DE 101 05 749 A1, a procedure is known to aid a utility vehicle at low speed, which is dependent on the position of the accelerator pedal and the depression of the vehicle friction brakes and the clutch, at the same time, and on each coordinating with one another. Under working conditions and the increased angle of the accelerator pedal, the brake pressure is decreased and, at the same time, the clutch pedal is depressed. The relationship between the accelerator pedal, the brake pressure and the clutch pedal is determined by the weight of the loaded vehicle.

The switch operation is a special driving mode used by drivers of utility vehicles and is not being compared to the starting-up operation. The switch mode depends on an exact positioning of the vehicle and it is accepted that the drive motor with the clutch works against the brake operation. Under operating conditions, the switch helper can work, given any position of the vehicle, not just one position. Starting-up help is restricted to the shortest possible period of time or to the lowest power of the engine on the brakes.

From DE 44 21 088 C2, a starting-up servo-mechanism is known for driving with automatic gears in which the control unit with low speed works with the brake system. When the accelerator pedal is at position zero, the control unit activates the brake system. If any of these conditions changes, it deactivates the brake system. When a vehicle has stopped on an incline, the starting-up servo-mechanism is activated but, when the brake pedal is released and the accelerator pedal depressed, the starting-up servo-mechanism is disengaged.

This procedure does not prevent the inadvertent rolling of the vehicle; it just provides a short-term solution until the brakes are released which makes it the responsibility of the driver to depress the brake pedal or accelerator pedal. If no sufficient torque is provided by the engine by the end of the short time span to hold the vehicle in its previous position or if the clutch is not released in time, the vehicle will inadvertently roll in the direction of the incline. This can be a dangerous situation if the driver is in the mountains and, when he releases the accelerator pedal, the brakes engage. In this case, the driver would instinctively depress the accelerator further and/or he would release the brake pedal or disengage the brake system and the brake system would automatically disengage when the higher speed is achieved.

Additionally, it is known from DE 198 48 448 A1 that brake pressure control can be activated when the vehicle is standing and after the driver turns on the operating system and selects the mode "starting-up assistant". The vehicle brakes for a short time can be applied with brake pressure. The driver can select a starting-up setting under which the clutch is engaged, but the brake pedal and accelerator pedal will not operate. In this case, the clutch would be in control. As soon as the clutch is switched to a higher gear, the starting-up assistant is engaged and the brake is released.

In DE 198 48 448 A1, the described brake assistant would receive a signal from the accelerator pedal to start-up and would use a selected setting. The course of the starting-up process and, in particular, the timing of the disengagement of the brake is not independent of the position of the accelerator pedal or from the engine load which have an influence on the clutch setting which determines when the brake gets released. If the driver depresses the accelerator pedal way down, the engine picks up speed, but the engine load is determined not by the position of the accelerator pedal, but by the position of the clutch. Once the engine load is determined and the clutch is set, a signal is sent to the release the brakes.

The moving speed and angle of the accelerator pedal is not evaluated in this instance. That is because a certain response time is needed to take the brakes off the wheels after giving the order to release the brakes. This response time cannot be predicted. It depends on the speed of the vehicle, the engine strength and the wheels. When the accelerator pedal is depressed quickly and heavily, the engine power rises in the period between the signal to release the brakes and the actual release of the brakes, which doesn't happen when the pedal is depressed slowly and lightly. Also this procedure does not allow optimum time between when the order is given to release the brakes and when it is carried out.

For example with pneumatic actuators, the target default for the adjustment speed of the clutch deviates somewhat. In addition with the driving motor, a number of revolutions or a torque default with the expected dynamics and/or a quality converted into actual values cannot be assumed. So, for example, more highly prioritized control interferences could be placed into the motor control of a vehicle (to operate through the brake system) to allow for a deviation from the requirements of a starting situation.

With this background for the invention, the task is the basis to present a control procedure for a starting assistant for a vehicle with a transmission and an automatically operable transmission clutch with which the time for the expenditure of the instruction is coordinated with the release of the brake better so that the time the actual instruction is carried out is aligned to the engine torque.

SUMMARY OF THE INVENTION

The invention is based on the realization that between the expenditure of an instruction for the release of the brake and the activation of reduction and halting of the braking action, a certain response time passes, which is to be called "dead time". Since up to the taking effect of the instruction for the release of the brake, the drive torque of the driving motor of the vehicle at the speed of angle and the amount of the angle of the accelerator pedal, adjusting is dependent on the time of the expenditure of the instruction which is directed at releasing the brake which is dependent on the motion of the accelerator pedal and/or the moving speed of the accelerator pedal.

Therefore, the invention goes out from the control unit of a starting assistance for a vehicle with a transmission, with an automatically controllable clutch and at least an automatically controllable brake on the wheels of the vehicle, to allow for the automatic or manual release of the brakes or the parking brake by the driver to stop the vehicle. The movement of the vehicle is here generally understood in relation to the ground under the wheel or track chain which makes it possible to stop the vehicle. The invention goes further out from the start assistant control unit which activates an operating mode to increase the jerking degree of the clutch for starting and which at least release the brake.

For the solution of the task posed, it is also intended that the start assistance control unit is operated in such a manner that the jerk degree of the clutch, starting from which is signaled that the brake is to be released, is dependent on the operating reactions of the drive train actuators, derived from the current accelerator pedal position and/or accelerator pedal adjustment speed.

Therefore the essence of the invention consists of the fact that not only is the accelerator pedal operation observed directly, but also from the accelerator pedal operation and/or accelerator pedal adjustment speed is derived the reactions of the different drive train actuator of, for example the clutch and the drive motor, on the relevant control unit operator and included into the braking control unit.

In this way, the time of the release of the brake can be determined in such a way that while taking the drive torque of the driving motor into consideration, it corresponds to the dead time on the wheels of the vehicle at the desired drive torque.

In particular, the time for the issues of the command can be selected for the release of the brake in such a way that at the time the motor drive torque takes effect on the wheels of the vehicle, the adjoining drive torque corresponds directly to the respective torque, which is needed, in order to prevent an unintentional rolling of the vehicle towards an incline. Alternatively, the time can be selected for the issuance of the command to release the brake in such a way that it takes into consideration the time of the taking effect of the command on the wheels with the desired initial torque remains during the dead time, which entails a desired acceleration of the vehicle.

In accordance with the preferred variation of the invention is the regulation of the jerk degree of the clutch specified above, starting from, which the brake is to be released, the operating reaction of the clutch actuator is signaled on the default of the clutch operating desired value, which can be a regulating speed or a regulating distance.

Additionally, the operating reaction of the engine actuator on an engine operating desired value, whereby this may be the engine speed or engine torque, can be evaluated.

In a further preferred operating form, the invention can be set up to consider the determination of the jerking degree of the clutch, starting from which the command is given to the brake additionally to solve the current gear ratio (for instance, an inserted transmission step). With vehicles having either manually or automatically selectable possible gears, the starting torque of the selected gear, resting against the wheels, is dependent in this way on the time for the issuance of the command selected for the release of the brake while considering individually the dead time in such a way also with starting in different courses at the time of the taking effect of the drive movement against the wheels of the vehicle at the desired torque.

In accordance with another variation of the procedure, it can be set so that additional information such as a computed, measured or entered vehicle mass is included into the determination of the jerking degree of the clutch, starting from when the brake is signaled to release. With rising mass of the vehicle, which effects the amount of torque needed in order to achieve a desired halt of a vehicle on an inclined flat surface and which can cause the vehicle to roll away, the amount of torque needed to achieve the desired acceleration rises.

Consideration of the vehicle mass can take place thereby in the simplest case, via a manual input, for example via a switch with several steps, via a continuously adjusting means or via a numeric input. In a favorable arrangement, the mass of the vehicle can be measured or computed. A number of procedures are possible for this. For example, the signal from the spring or from force sensors can determine the range of the chassis. Alternatively also the relationship of acceleration and for it the necessary amount of fuel can be evaluated, whereby also information about the upward gradient can be evaluated. Finally, the amount of braking force can be calculated for the minimum needed to hold the measured mass of the vehicle on an inclined level.

It is not favorable for starting on the horizontal surface if one does not enter additional information concerning the strength of the vehicle as well as the determination of the jerking degree of the clutch, the start of which signals the brake to be released. The more the ground is inclined against the direction in which you are driving, the greater the torque which must be made available at the time the command is given to release the brakes in order to prevent the vehicle form rolling away. During an inclination in the direction in which you are driving, the torque is accordingly smaller, which can be applied for a desired initial acceleration. The strength resulting from the inclination of the ground can, for example, be determined from the information of an inclination sensor and the vehicle mass for holding or also by the determination of the braking force, which is the minimum needed, in order to hold the vehicle on an incline.

In accordance with another variation of the procedure, additional information can be set about the presence of a trailer transmission and/or about the mass of a trailer which enters also into the determination of the respective jerking degree of the clutch which signals the brake to be released. With a rise in mass due to a trailer, this can affect the ability to hold the vehicle on a flat surface and can cause the inadvertent rolling away of the vehicle and this increases the torque needed to achieve the desired starting acceleration.

The consideration of the impulsion caused by a trailer can take place thereby in the simplest case, via a digital signal, which can come, for example, from an automatic recognition of the trailer or via a manual input, such as a switch. Automatic recognition of a trailer coupled to the vehicle can be accomplished by a CAN-BUS system, which is a well-known electronic network.

In a favorable arrangement, the signal can contain information about how large the mass is of the trailer and/or the strength resulting from it. This can happen, on the one hand, in the form of an input device, into which the information is entered by input of a value or by selection of a weight class. It is especially favorable, however, at the trailer clutch of the vehicle and/or at the bearing position of a semi-trailer, if the working strength in the driving direction and/or against the driving direction is determined. In this way, the time for the issuance of the signal can be determined, for example, also correctly if the towing vehicle stands on an even flat surface and, at the same time, the trailer stands on a ramp or another flat place.

From the angle of the accelerator pedal and/or from the speed of the depression of the accelerator pedal can be determined the well-known dead time, how large the engine movement will be as well as how long the command to release the brakes will take effect, and/or when the instruction must be given to the brake to release so that the dead time can be calculated at the time that the command to release the brakes from the wheels is effected. Accordingly, the jerk degree of the clutch can be specified, with which the command is given to release the brake. In this case, however, the computed, measured or calculated torque can be entered as well as the determination of the jerking degree of the clutch which signals the brake to be released.

In order to increase the accuracy of the presented procedure further, additional information about the net torque of the driving motor, computed from the gross torque of the driving motor for auxiliary drives and other drive power consumers, can be entered to aid in determination of the jerking degree of the clutch, which signals the brake to be released.

Further improvement can be achieved by entering additional information about the braking force needed by the wheels of the vehicle. The necessary braking force can be determined by sensors on the brake assembly of the vehicle.

Since the torque at the start-up acceleration is directly dependent on the clutch and the motion and direction of the wheels of the vehicle, the value for the direct implementation of the command for the release of the brake cannot be used since, in this case, the dead time can not be considered. With the help of the torque at start-up acceleration, however, the course of the moment at the start-up acceleration can be determined by depression and/or the speed of the depression of the accelerator pedal. This information can be used, in order to seize the connection between the operation of the accelerator pedal and the course of the torque which can be expected.

The more exactly this connection is expressed, the better. With the given accelerator pedal, it can measure the desired torque at the start-up acceleration. Accordingly, the time can be determined of the issuance of the command to the release the brake and/or the jerk degree of the clutch which calculates the dead time.

The presented procedure is a relatively favorable application for any land vehicle. In accordance with the procedure, the invention is of special importance, however, for commercial motor vehicle and, in particular, for vehicles that transport goods. Since these vehicles carry additional loads which vary greatly in weight, it is often particularly dangerous for the drivers of these vehicles without a rolling prevention device or something else to work against the motor and the brakes, in addition to the clutch at start-up.

The invention claimed is:

1. A method for controlling start-up assistance, to prevent vehicle rolling during vehicle start up, for a vehicle with a transmission, an automatically controllable clutch, at least an automatically controllable brake affecting wheels of the vehicle, and a starting assistance controller that is automatically or manually activateable by a driver using a parking brake when the vehicle is stopped, and which controls the clutch and releases the automatically controllable brake during activation of an operating mode for starting, the method-comprising the steps of:
   determining at least one drive train actuator operating reaction value from at least one of:
      a current accelerator pedal depression position,
      a current accelerator pedal depression speed,
      a current gear ratio,
      an engine actuator value determining a desired engine output torque, and
      a total vehicle mass,
   determining a desired clutch operating value,
   determining a clutch jerk degree value for the clutch, during vehicle start-up to prevent rolling of the vehicle during start-up, from the at least one drive train actuator operating reaction value and the desired clutch operating value, wherein the clutch jerk degree value represents a time interval between a start of engagement of the clutch and a start of disengagement of the automatically controllable brake initiated by an end of the clutch jerk degree value interval, and
   initiating disengagement of the automatically controllable brake during the clutch jerk degree interval.

2. The method according to claim 1, further comprising the step of assigning one of a regulating speed or a regulating distance as the clutch operating desired value.

3. The method according to claim 1, further comprising the step of assigning an engine speed or an engine torque as the engine actuator value.

4. The method according to claim 1, further comprising the step of receiving one of a computed, a measured and an entered vehicle mass along with a determination of the degree of jerking of the clutch, which signals the brakes to be released.

5. The method according to claim 1, further comprising the step of entering information about a strength resulting from a non-horizontal vehicle along with a determination of the degree of jerking of the clutch, which signals the brakes to be released.

6. The method according to claim 1, further comprising the step of entered information concerning a presence of one or more of an impulse and a mass of a trailer along with a determination of the degree of jerking of the clutch, which signals the brakes to be released.

7. The method according to claim 1, further comprising the step of entering one of a computed, a measured and a calculated torque at the start-up acceleration along with a determination of the degree of jerking of the clutch, which signals the brakes to be released.

8. The method according to claim 1, further comprising the step of entering, along with a determination of the degree of jerking of the clutch, which signals the brakes to be released, information about a net torque of the driving motor, computed from a gross torque of the driving motor along with torque portions for at least one other auxiliary drive and at least one other non-propulsion-effective drive power consumer.

9. The method according to claim 8, further comprising the step of determining an essentially needed braking force on the motor wheels by sensors on a brake assembly of the vehicle.

10. The method according to claim 1, further comprising the step of sending information about an essentially needed braking force to motor wheels of the vehicle along with a determination of the degree of jerking of the clutch, which signals the brakes to be released.

11. The method according to claim 1, further comprising the step of using the method in a commercial motor vehicle which is suitable for transport of goods.

* * * * *